United States Patent [19]

Retallick

[11] 3,752,187

[45] Aug. 14, 1973

[54] LAMINATED FLOW ELEMENT

[76] Inventor: David Arthur Retallick, Betzenweg 68, 8 Munich 60, Germany

[22] Filed: Nov. 10, 1971

[21] Appl. No.: 197,396

[30] Foreign Application Priority Data

Nov. 10, 1970 Germany .................. P 20 55 237.8

[52] U.S. Cl. .................................. 137/608, 137/833

[51] Int. Cl. ........................... F17d 1/00, F15c 5/00

[58] Field of Search .................... 137/81.5; 101/211; 96/36.4; 137/608

[56] References Cited

UNITED STATES PATENTS

| | | | |
|---|---|---|---|
| 3,378,023 | 4/1968 | Beeken | 137/81.5 |
| 3,495,604 | 2/1970 | Trask | 137/81.5 X |
| 3,568,692 | 3/1971 | Metzger et al. | 137/81.5 |
| 2,569,752 | 10/1951 | Fowler | 96/36.4 X |
| 3,114,390 | 12/1963 | Glattli | 137/81.5 |
| 3,185,166 | 5/1965 | Horton et al. | 137/81.5 |
| 3,461,900 | 8/1969 | Dexter et al. | 137/81.5 |
| 3,646,963 | 3/1972 | Klee | 137/81.5 X |

*Primary Examiner*—Samuel Scott
*Attorney*—Howard L. Rose and Ira C. Edell

[57] ABSTRACT

The invention concerns a flow element and method of making which consists of several plates stacked (layered) on top of each other having flow channels arranged therein and in which the number of layers is reduced by providing at least one channel completely enclosing a section of a plate. The above is accomplished by etching such a channel from both surfaces of a plate in which the channel is to be formed except in one region which is etched from one side only. A connecting web remains at this latter region and if a restriction is not desired in this region of the channel, the channel is made wider than the rest of the channel to the extent necessary to compensate for the lesser depth thereat.

5 Claims, 2 Drawing Figures

LAMINATED FLOW ELEMENT

BACKGROUND OF THE INVENTION

Fluid amplifiers are disclosed in numerous U.S. patents, consisting of three plates stacked on top of each other, in which the intermediate plate, which is covered on both sides with a cover plate, is arranged with flow channels extending completely through the plate and which terminate in holes in one of the cover plates. Conduits connect to these holes to provide power and control flows to various channels selectively. The plates may consist of metal, special glasses and plastics and other etchable materials. Holes and channels in the material may be fabricated by means of full-etching. In the case of full-etching a photosensitive material is applied to all surfaces of a plate and the large opposite surfaces are exposed through identical (mirror image) film negatives with the photographically exposed holes and channels placed in alignment on both sides of the plate. The plate is immersed into an etching solution to dissolve the metal simultaneously from both sides of the plate in the region of the exposed or unexposed photosensitive material depending upon the type of material employed.

Such a manufacturing process fails when the middle plate has a channel, which encloses a section of the plate completely, since the plate section falls out after completion of etching.

Since fluidic elements exist in which, for example, plate sections are enclosed (surrounded) by a channel in form of islands due to return channels (feedback channels), see for instance U.S. Pat. No. 3,425,430, the object of the present invention is to provide a flow element of the preceding type, which is manufacturable by means of an etching process whilst avoiding the loss, after etching, of the part of a plate surrounded by a channel section.

SUMMARY OF THE INVENTION

The object of the present invention is achieved by forming a relatively short length or lengths of the channel by half-etching which does not completely penetrate through the plate. The term half-etching denotes etching the plate from only one side thereof by means of an etching liquid acting for a length of time such that only a recess is etched into the plate. Specifically, whenever a web is to be formed, the mirror image negatives, through which the photosensitive material in the plate is exposed, differ so that the web area is exposed on only one side of the plate. When etching occurs, by the time the channel is etched through, the web area is etched only half way through since it is etched from one side only.

It is clear that an island-like plate section, which is surrounded by a channel, does not fall out of the plate, if at least one narrow material bridge, a web, remains standing in a suitable location in the channel, which holds the plate section in connection with the remaining plate. This bridge location can be chosen wherever desirable with due consideration to circuit configurations. Of course more than one web may be employed if considerations of physical strength so dictate. In order to prevent the web from constituting flow restriction, the channel may be widened at its location.

The principle of the invention however is ideally suited to provide plates with channels which exhibit reduced depths of channels in certain locations in order to provide flow restrictions or inertances, which can be formed far move advantageously than by known techniques wherein the channel extends through the whole depths of a plate at right angles to the plane of the plate and which is very narrow in the plane of the plate.

Another object of the invention is to provide a channel section forming a restriction which is produced by means of half-etching in a plate at right angles to its major surfaces.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein.

DESCRIPTION OF THE PREFERRED EMBODIMENT

Figure 1:
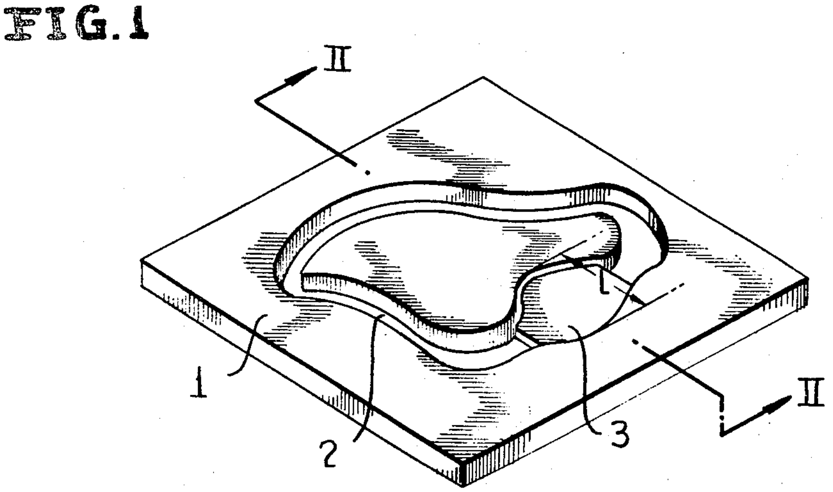
FIG. 1 is a plan view of a plate with an etched channel.
Figure 2:
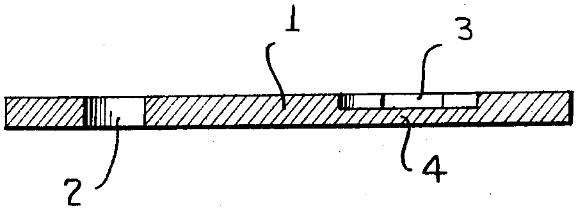
FIG. 2 is a section through lines II—II in FIG. 1.

A channel 2 is etched in an intermediate plate 1 by means of full-etching, that is, etching concurrently from both sides of the plate, whereby channel 2 completely penetrates the plate 1. In a section 3 of the channel there is located a material bridge 4 which is produced by half-etching, that is, etching from only one, the upper side of the plate, as viewed in the Figures. The half-etching is for example possible since mirror image identical negative photos of the channel are placed on both sides of the plate 1, except that the corresponding region 3 is blackened in one photograph on one side of the plate. Thus the etching liquid leaves the plate unetched in this region on this one side of the plate while the opposite side of the plate in this region is etched.

The channel exhibits in region 3 a certain width "1" depending on the depth of the etching in this region. in order to avoid restriction of the flow in this area, if this is intended. However, if a flow restriction or inertance is desired, the width 1 of the channel in region 3 can be chosen correspondingly smaller. Such restrictions can represent nozzle openings for conventional fluidic amplifiers, and inertances such as elements 92 in FIG. 8 of the aforesaid U.S. Patent.

Referring specifically to FIG. 8 of the aforesaid patent, the problem which the present invention solves can readily be seen. The flow path consisting of elements 84, 85, 89, 91 and 92, completely encircle an unrecessed part of the plate. Thus the channels cannot completely penetrate the plate and as a result machining techniques are employed in a plate at least twice the depth of the channels. The present technique is considerably cheaper since it eliminates machining and uses considerably less material. Further the technique is applicable to the type of structure disclosed in the aforesaid patent since the channels can be formed by half-etching; i.e., etching from one side and the input, output and vent holes 146, 152, 144 of FIG. 11 of said patent can be formed concurrently by etching from both sides.

While I have described and illustrated one specific embodiment of my invention, it will be clear that variations of the details of construction which are specifically illustrated and described may be resorted to without departing from the true spirit and scope of the invention as defined in the appended claims.

I claim:

1. A flow element consisting of several stacked plates and including at least one intermediate plate in which an endless flow channel is formed, said endless flow channel penetrating transversely of flow direction through the entire thickness of said intermediate plate over most of the length of said endless flow channel, the remainder of said endless flow channel penetrating transversely through only a portion of the thickness of said intermediate plate.

2. The flow element according to claim 1 wherein said endless flow channel is widened in the plane of said intermediate plate of said remainder of said endless flow channel.

3. The flow element according to claim 2 wherein the widened portion of said endless flow channel has a cross-sectional area which is substantially equal to the cross-sectional area of said endless channel over said most of its length.

4. A flow element comprising a plurality of stacked plates including at least one intermediate plate in which is formed a flow channel having a flow restriction therein; said flow channel extending longitudinally in the plane of said intermediate plate and having a nominally constant width throughout its length, said flow channel penetrating through the entire depth of said intermediate plate except at said flow restriction, said flow restriction being defined by less than full penetration of said flow channel through said intermediate plate.

5. In a flow element of the type in which a plurality of stacked plates include an intermediate plate in which at least one flow channel is defined and extends lengthwise in the plane of said intermediate plate and depthwise entirely through the thickness of said intermediate plate, a flow restriction defined in said flow channel in the form of a lengthwise-extending portion of said flow channel having a lesser depth than the thickness of said plate, the cross-sectional area of said portion of said flow channel being smaller than the cross-sectional area of said flow channel where said flow channel extends depthwise entirely through the thickness of said intermediate plate.

* * * * *